United States Patent [19]
Kawai et al.

[11] Patent Number: 5,183,221
[45] Date of Patent: Feb. 2, 1993

[54] FISHING REEL

[75] Inventors: Michiki Kawai, Aichi; Takeo Miyazaki, Tokyo, both of Japan

[73] Assignee: Daiwa Seiko, Inc., Tokyo, Japan

[21] Appl. No.: 683,065

[22] Filed: Apr. 10, 1991

[30] Foreign Application Priority Data

Apr. 18, 1990 [JP] Japan ............................... 2-40662[U]

[51] Int. Cl.5 ............................................. A01K 89/00
[52] U.S. Cl. ................................... 242/310; 242/282
[58] Field of Search .................. 242/310, 323, 282; D22/137, 141

[56] References Cited

U.S. PATENT DOCUMENTS 2,555,824  6/1951  Stout ................................... 242/294
4,261,528  4/1981  McKinney .......................... 242/323
4,821,978  4/1989  Kaneko ............................... 242/310
4,943,012  7/1990  Aoki ............................... 242/310 X Primary Examiner—Daniel P. Stodola
Assistant Examiner—Michael R. Mansen
Attorney, Agent, or Firm—Longacre & White

[57] ABSTRACT

A fishing reel in which a spool is rotatably supported to a reel body having right and left side frames and support frames, each integrally, transversely connecting the right and left side frames to each other, the fishing reel comprising an improvement wherein one of the support frame located above the spool at a front side of the reel has an inner edge bent forward as viewed from above the reel. Accordingly, a thumb of a fisherman's hand grasping a fishing reel can be easily and naturally put on a support frame.

5 Claims, 3 Drawing Sheets

FISHING REEL

BACKGROUND OF THE INVENTION

The present invention relates to an improvement of a fishing reel in which a spool is rotatably supported to a reel body including frame members.

Japanese Utility Model Unexamined Publication No. 63-124,373 discloses a fishing reel in which a reel main body is integrally formed with right and left side frames and support frames connecting the right and left side frames to each other.

However, one of the support frames, which is located at an upper portion of the main body, extends linearly parallel to an axis of a spool so as to connect the right and left side frames. No particular attention is paid to its configuration. Therefore, the fisherman's grip feeling at the time of holding the reel body with his hand, i.e. the feeling of putting his thumb on the support frame and the thumbing operation of the reel to control the rotation of the spool is unnatural and makes it impossible for the fisherman to hold the reel stably in fishing. As a result, the fisherman cannot perform the fishing operation smoothly. Further, when backlash occurs in the fishing reel, it is difficult for the fisherman to straighten out a tangled fishing line around the spool because the support frame hinders the fisherman's work.

SUMMARY OF THE INVENTION

Accordingly, it is an object of the present invention to provide a fishing reel in which a support frame of a frame body is formed as a suitable shape to enable comfortable holding, as well as a natural griping manner, and thumbing operation, to thereby solve the above-mentioned problems.

In order to attain the above-noted and other objects, the present invention provides a fishing reel in which a spool is rotatably supported on a reel body having right and left side frames, and improved support frames integrally, transversely connecting the right and left side frames to each other, wherein one of the support frames, located above the spool at a front side of the reel, has an inner edge bent forward as viewed from above the reel.

The bent support frame is preferably formed with the inner edge having a substantially semicircular arcuate shape for the purpose of improving holding of the reel, so as to make it possible for a fisherman to hold the reel stably with his right, left or both hands in any situation while fishing.

The support frame may be shaped so that an apex of the inner edge toward the front side of the reel is offset toward one of right and left side frames which supports the drive means for driving the spool, because a thumb of the one hand can be naturally and easily put on the support frame while turning a handle of the drive means with the other hand, thereby improving the ability to hold the reel. Due to this arrangement, the fishing operation is further improved and the physical tiredness of the hand and fingers grasping the reel is extremely reduced.

Also, the support frame is preferably formed with an inclined surface, whereby the height of the support frame in cross section gradually increases from the inner edge to an upper surface of the support frame for the purpose of easily and surely putting his thumb on the support frame.

Further, it is preferable that another one of the support frames, which is also integrally connected to the right and left side frames, is formed with an inner edge bent backward as viewed from above for the purpose of enlarging an open space located above the spool and defined by the right and left side frames as well as the two support frames.

DETAILED DESCRIPTION OF THE PREFERRED EMBODIMENTS

Preferred embodiments of the present invention will now be described with reference to the accompanying drawings attached hereto.

Figure 1:
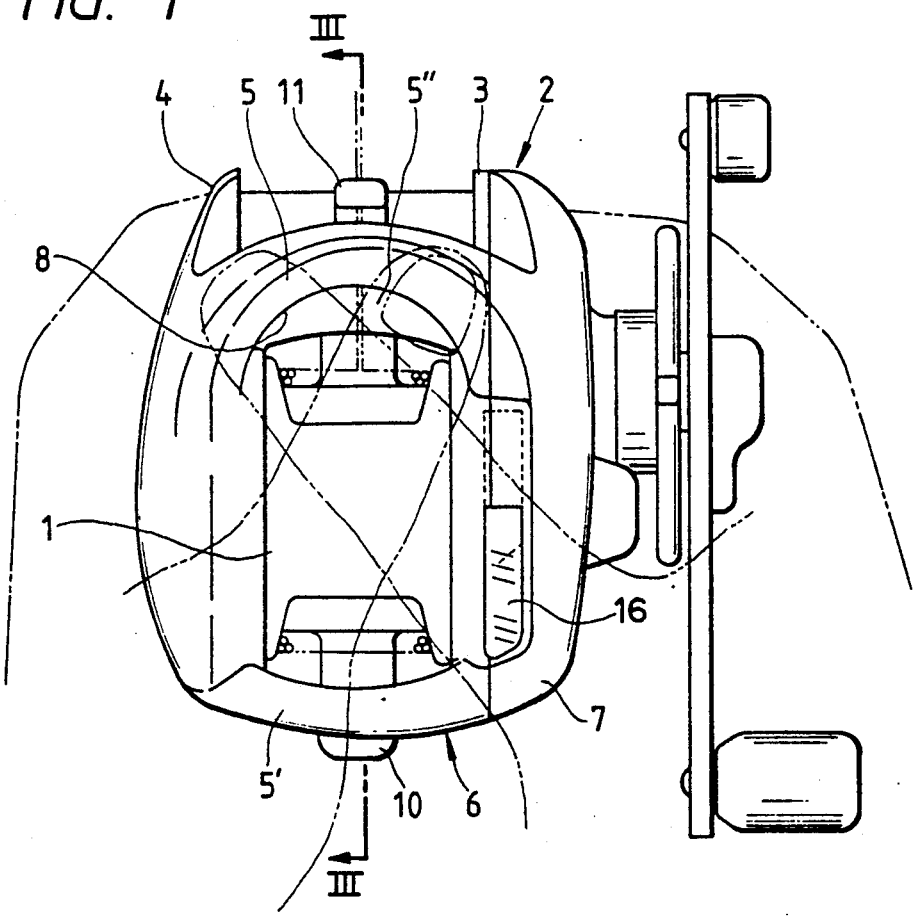
FIG. 1 is a plan view showing a fishing reel according to a first embodiment of the present invention.
Figure 2:
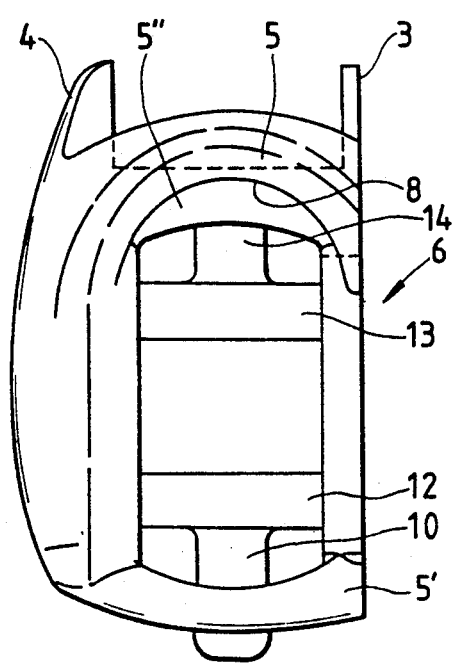
FIG. 2 is a plan view showing a reel body illustrated in FIG. 1.
Figure 3:
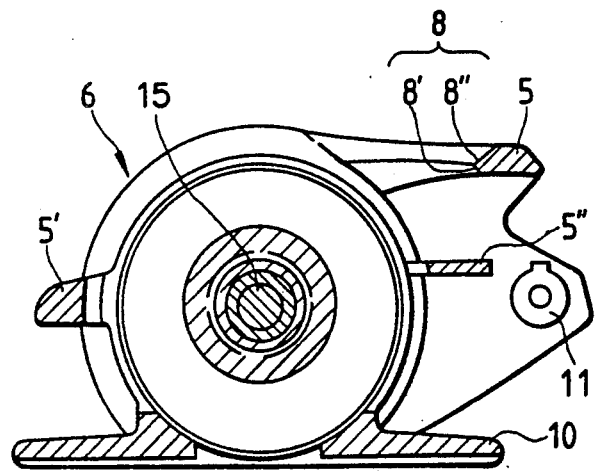
FIG. 3 is a cross-sectional view taken along line III—III in FIG. 1.

FIGS. 1 to 3 show a fishing reel according to a first embodiment of the present invention.

In a fishing reel, a spool shaft 15 of a spool 1 is rotatably supported on a reel body 2. The reel body 2 comprises right and left side frames 3 and 4, and a plurality of support frames 5, 5' and 5'', each of which transversely connects the right and left side frames to each other. Further, the right and left side frames 3 and 4 are transversely connected by bases 12 and 13 having legs 10 and 14 for mounting the reel onto a fishing rod. In this embodiment, the right and left side frames 3 and 4, the support frames 5, 5' and 5'', and the bases 12 and 13 are integrally molded as a single integral member to form a frame body 6. The reel body 2 is further provided with a side plate 7 removably fixed to the frame body 6 at its right side frame 3.

The support frame 5, which is one of the support frames and located at an upper and front portion of the reel, is bowed forward from both of the side frames 3 and 4. More specifically, the bowed support frame 5 is located such that a height of an upper surface of the bowed support frame 5 relative to a mounting surface defined by the legs 10 and 14 is set nearly equal to that of a periphery of a flange of the spool 1 as best shown in FIG. 3, and the bowed support frame 5 is disposed between the spool shaft 13 and a level winder 11 when observed in a plan view. The bowed support frame 5 is bent forward from the side plates 3 and 4 such that both ends of the support frame 5 are located in the vicinity of the flange of the spool 1 and a middle portion thereof is located above the level winder 11. This arrangement enables a thumb of a fisherman's hand grasping the reel to be easily put on the support frame 5 when fishing. The bowed support frame 5 is formed with an inner edge portion 8. The inner edge portion 8 is also bowed forward from both side frames 3 and 4. Thus, the inner edge portion 8 forms a substantially semicircular arcuate shape when considered in the plan view. Due to the shape of the inner edge portion 8 of the support frame 5, it is possible to greatly enlarge an open space defined between the right and left side frames 3 and 4 as well as the front and rear support frames 5 and 5'. Further, in this embodiment, the support frame 5' located at rear portion of the reel, is formed with an inner edge portion bowed backward from both side frames 3 and 4, so that the space is further extended.

It is preferable that the inner edge portion 8 of the support frame 5 is formed with a guide surface 8' standing substantially vertically and an inclined guide surface 8" inclined relative to the guide surface 8' as shown in FIG. 3, since it is easier to put the thumb of the fisherman's hand grasping the reel on the support frame 5.

Figure 4:
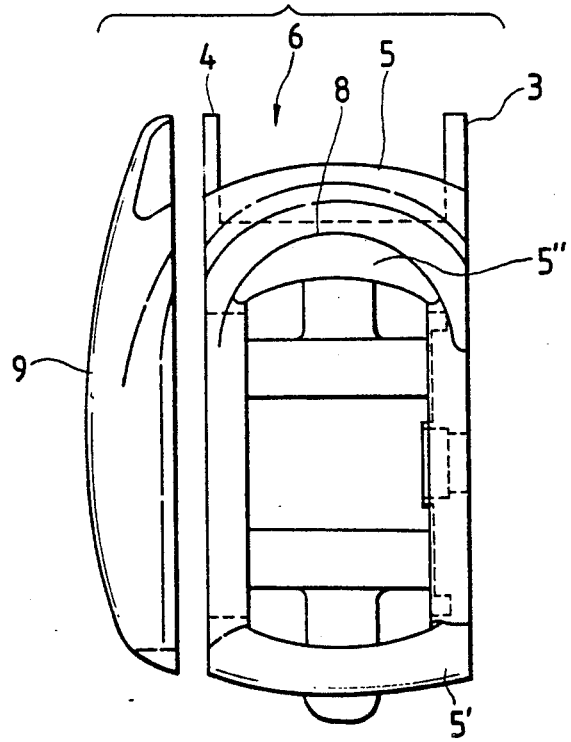
FIG. 4 is an exploded plan view showing a modified reel body.

An outer edge portion of the support frame 5 is also bowed forward from the side frames 3 and 4 in this embodiment, but it may be formed is a linear shape. Further, the side frame 4 and a side plate are formed as a single integral member in this embodiment, but, as shown in FIG. 4, the side plate may be formed as a separate member 9 removably fixed to the side frame 4 as is the side plate 7.

In the fishing reel thus constructed, when the reel body 2 is grasped and held by the fisherman's right or left hand indicated by the two dotted lines in FIG. 1, the fisherman can naturally extend his thumb and put a tip of his thumb on the bowed support frame 5, so that the fisherman can easily control rotation of the spool with a middle portion of his thumb and stably wind a fishline on the spool, thereby enhancing the reel operation.

In addition, the numeral reference 16 denotes a manipulation piece for a clutch lever.

Figure 5:
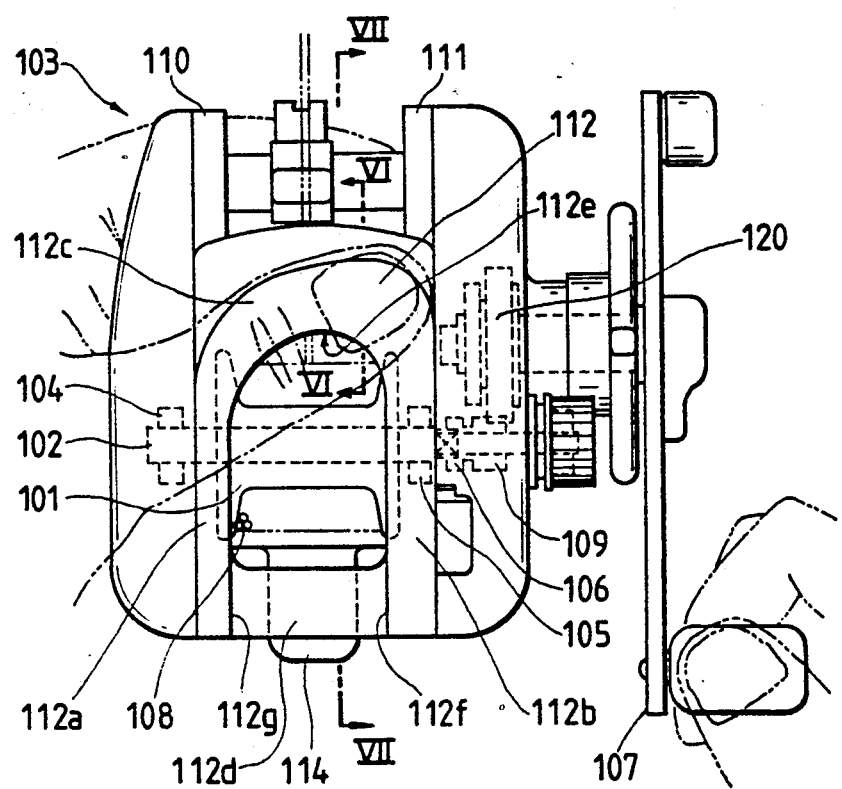
FIG. 5 is a plan view showing a fishing reel according to a second embodiment of the present invention.
Figure 6:
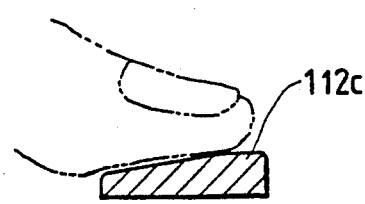
FIG. 6 is a cross-sectional view taken along line VI—VI in FIG. 5.
Figure 7:
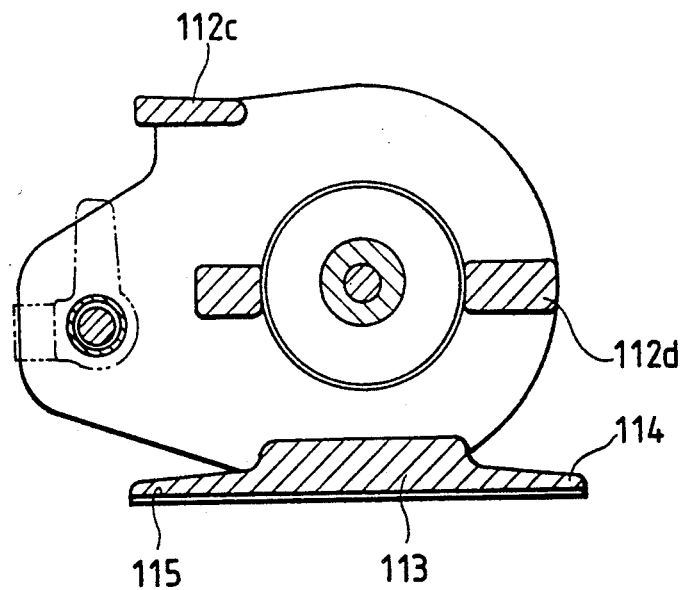
FIG. 7 is a cross-sectional view taken along line VII—VII in FIG. 5.

FIGS. 5, 6 and 7 show a fishing reel according to a second embodiment of the present invention.

In the fishing reel, a spool shaft 102 securely fixed to a spool 101 winding a fishline 108 thereon is rotatably supported at both ends by a reel body 103 through bearings 104 and 105. The spool shaft 101 is connected through the known clutch mechanism 106 to transmission means so that the turning of the handle 107 causes the spool 101 to be rotated for winding a fishline 108. The transmission means comprises a pinion 109 connected to the clutch 106, and means 120 meshed with the pinion 109 so as to transmit the rotational torque of the handle 107 to the pinion 109.

The reel body 103 comprises left and right side frames 110 and 111, and a support frame 112 transversely connecting the left and right side frames 110 and 111. The reel body 103 further comprises a base 113 having legs 114 and 115 for mounting the reel onto a fishing rod. The support frame 112 is formed integrally with two parallel portions 112a and 112b, each extending along a periphery of respective one of the side frames 110 and 111, a bowed portion 112c connecting the parallel portions 112a and 112b at a front side of the reel, and a substantially planner portion 112d opposite the bowed portion 112c and connecting the parallel portions 112a and 112b, at a rear side of the reel. The bowed portion 112c has a substantially arcuate configuration bowed forward from the parallel portions 112a and 112b, and a top 112c of an inner edge of the bowed portion 112c is slightly offset from a center between the parallel portions 112a and 112b. More specifically, in a plan view, the inner edge of the bowed portion 112c begins at a portion located above the spool shaft, becomes farthest away from the spool shaft at a top 112e which is slightly offset from the center between the parallel portions 112a and 112b, and ends at a portion located above a body of the spool. Accordingly, an upper surface of the bowed portion 112c receives a thumb of a fisherman's left hand grasping the reel when the latter is put on the former.

FIG. 6 illustrates a cross-sectional view of the bowed portion 112c taken along line VI—VI in FIG. 5, the bowed portion 112c has a substantially rectangular shape in cross-section, but a rear half of the upper surface is slightly inclined downwardly, so that the bowed portion 112c which receives the fisherman's thumb is further enhanced. The substantially planer portion 112d opposite to the bowed portion 112c is connected through step portions 112f and 112g with the side portions 112a and 112b for the purpose of lowering the position of the planer portion 112d. Accordingly, a thumb of the fisherman's hand grasping the rod can be easily put on the planer portion 112d, thereby using the planer portion 112d as a thumb rest.

In this embodiment, the frames 110 and 111 are simultaneously formed with the support frame 112 as a single integral member by molding them together. However, the present invention is not restricted thereto or thereby. For example, the left and right side frames 110 and 111, and the support frame 112 may be separately formed and securely or removably fixed to each other.

Also, the bent portion 112c is formed integrally with the substantially planner portion 112d through the parallel portions 112a and 112b in this embodiment, but the bent portion 112c and the planner portion 112d may be separately formed as in the first embodiment. The planner portion 112d may also be movably arranged so as to be used as a manipulation member for the clutch.

Figure 8:
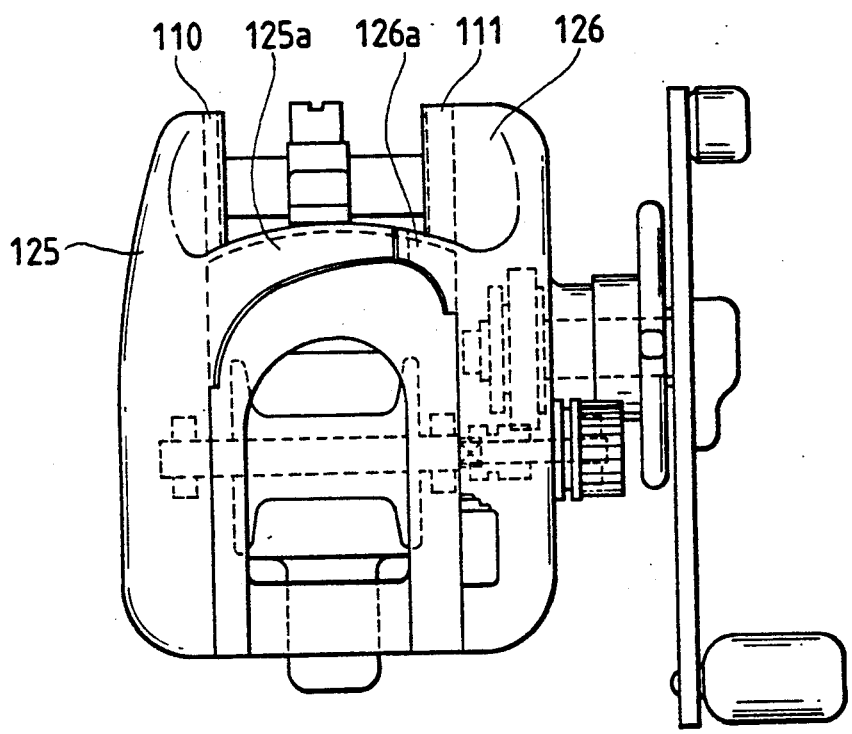
FIG. 8 is a plan view showing a modified one of the fishing reel acording to the second embodiment of the present invention.

Further, as shown in FIG. 8, a front half of the bent portion 112c may be covered with cover portions 125a and 126a integrally formed in side plates 125 and 126 removably attached to the side frames 110 and 111, respectively.

According to the present invention, a thumb of a fisherman's hand grasping a fishing reel can be easily and naturally put on a support frame since an inner edge of the support frame is bowed forward from both side frames at a front of the reel, whereby the support frame receives the thumb above an enlarged open space above a spool. Due to this configuration of the support frame, the ability to hold the reel is improved so that it is possible to hold the reel stably and to enhance the winding operation for winding a fishline onto a spool. Further, the spool thumbing property of the reel is improved to facilitate control of the rotation of the spool of the reel by his thumb. Furthermore, even if a backlash occurs, the fisherman can easily straighten the tangled line since the space above the spool is enlarged.

What is claimed is:

1. A fishing reel comprising:
   a spool rotatably supported on a reel body;
   said reel body comprising leg means for mounting said fishing reel on an elongated fishing rod, said leg means interposed between right and left side frames of said reel body, and a thumb support frame connecting said right and left side frames, wherein said right and left side frames extend substantially parallel to said fishing rod and said thumb support frame extends generally transverse to said fishing rod; and wherein said thumb support frame is bowed outward from said reel body in a first direction generally extending along said fishing rod for ergonomically receiving a thumb, whereby said fishing reel may be comfortably gripped and operated.

2. The fishing reel according to claim 1, wherein an inner edge of said thumb support frame confronting said spool has a substantially semicircular arcuate shape which embraces said spool.

3. The fishing reel according to claim 1, wherein an inner edge of said thumb support frame confronting said spool has an asymmetric arcuate shape offset toward one of said right and left side frames provided with drive means for driving the spool.

4. The fishing reel according to claim 1, wherein said thumb support frame is formed with an inclined surface adapted to receive a thumb of a fisherman, said inclined surface gradually flares away from said fishing rod as said thumb support frame bows outward from said reel body.

5. The fishing reel according to claim 1, further comprising another support frame transversely connecting said right and left side frames, wherein said another support frame is bowed outward from said reel body in a second direction generally opposite to said first direction.

* * * * *